United States Patent [19]
Worrell

[11] Patent Number: 5,774,709
[45] Date of Patent: Jun. 30, 1998

[54] ENHANCED BRANCH DELAY SLOT HANDLING WITH SINGLE EXCEPTION PROGRAM COUNTER

[75] Inventor: Frank Worrell, San Jose, Calif.

[73] Assignee: LSI Logic Corporation, Milpitas, Calif.

[21] Appl. No.: 567,944

[22] Filed: Dec. 6, 1995

[51] Int. Cl.$^6$ ..................................................... G06F 9/38
[52] U.S. Cl. ........................... 395/580; 395/570; 395/591; 395/800.41
[58] Field of Search ..................... 395/375, 580, 395/591, 595, 800.41, 376, 570, 800

[56] References Cited

U.S. PATENT DOCUMENTS

| | | |
|---|---|---|
| 4,755,966 | 7/1988 | Lee et al. ................................ 395/375 |
| 4,868,735 | 9/1989 | Moller et al. ............................ 395/375 |
| 5,481,685 | 1/1996 | Nguyen et al. .......................... 395/591 |
| 5,564,028 | 10/1996 | Swoboda et al. ....................... 395/375 |
| 5,603,047 | 2/1997 | Caulk, Jr. ............................ 395/800.23 |

*Primary Examiner*—Kenneth S. Kim
*Attorney, Agent, or Firm*—Townsend and Townsend and Crew LLP

[57] ABSTRACT

The handling of branch delay slots in MIPS microprocessors is enhanced. Branch instructions can be placed in branch delay slots by the judicious operation of the Exception Pointer Counter and the BD bit in the Cause register for exception handling.

3 Claims, 2 Drawing Sheets

ENHANCED BRANCH DELAY SLOT HANDLING WITH SINGLE EXCEPTION PROGRAM COUNTER

BACKGROUND OF THE INVENTION

The present invention is related to the field of microprocessor and instruction set design and, more particularly, to the design of MIPS RISC microprocessors, microcontrollers and their instruction set architectures. These devices and their instruction set architectures originated from MIPS Computers, Inc. of Mountain View, Calif. Presently there are many other integrated circuit manufacturers which support these RISC (Reduced Instruction Set Computer) microprocessors and microcontrollers, which are collectively termed MIPS microprocessors in the description below. Hence the term, MIPS microprocessors, refers to the devices and instruction set architectures from this body of manufacturers, and not necessarily to MIPS Computers alone.

The instructions of a computer program are typically stored in sequential address locations of a memory. In the normal course of execution, the CPU (Central Processing Unit) of a computer increments the contents of a register, called a Program Counter, which addresses the memory to load instructions from the memory. Instructions which break the sequential execution of instructions include branch instructions.

MIPS microprocessors require one instruction clock cycle to calculate the targeted address of a branch instruction. Hence there is a one clock cycle delay. To ensure that the operation of the CPU is not slowed, MIPS instruction architectures execute an instruction in this delay slot. Delay slots may be filled with useful instructions by reordering instruction sequences. For example, an instruction which logically precedes the branch instruction may be moved into the delay slot. Also, the instruction which is the target of the branch instruction may be duplicated in the delay slot if there are no ill effects when the branch condition is not satisfied. Likewise, if there are no ill effects when the branch condition is satisfied, an instruction after the branch instruction may be moved into the delay slot. Finally, if there are no suitable instructions, a NOP instruction may be inserted into the slot.

In the instruction architecture of MIPS microprocessors, there are three basic types of branch instructions. The first type is the simple Jump, or an Unconditional Branch, instruction in which the CPU is directed to the instruction at the target address specified in the Jump instruction. The second type is the Conditional Branch instruction. In this case, the CPU takes a branch to the instruction at the target address if a specified condition is true. If the branch is not taken, the CPU continues to execute instructions sequentially. A third type of branch instruction is a Branch Likely instruction, which also branches to an instruction at a target instruction if a test condition is true. However, there is a difference between a Conditional Branch instruction and a Branch Likely instruction. In the case of a Branch Likely instruction, if the branch is not taken, the delay slot instruction is nullified. In the case of a normal Conditional Branch instruction, the instruction in the delay slot is executed even if the branch is not taken.

In the instruction set architectures for MIPS RISC microprocessors, such as the R2000, R3000, R4000 and R6000 devices, branch (including jump) instructions typically require a one clock cycle delay, as stated above. The delay allows for the address of the target instruction to be calculated. Such a delay opens a slot in the pipelined CPU operations, which slows operations of these microprocessors. To maintain performance, the instruction set architectures permit an instruction to be placed in the delay slot so that overall operation of the CPU is not hindered. The instruction which can be inserted into the delay slot is constrained to avoid undesirable side effects. Otherwise, a NOP (No Operation) instruction is inserted. One instruction which cannot be placed into a delay slot in the MIPS-1 and MIPS-2 instruction set architectures is another branch instruction.

Accordingly, MIPS compilers do not support branch instructions in branch delay slots. Even present MIPS assemblers do not support all cases of branch instructions in branch delay slots well. The MIPS assemblers assume that the PC value after a branch is the branch instruction address plus 4. When branches are allowed in branch delay slots, this assumption fails. This is almost never a problem if the delay instruction is a Jump instruction, but it is a problem if the delay slot instruction is any other branch instruction. All branches except the Jump instructions compute the branch address by adding to the PC. The assembler incorrectly assumes the PC is the branch instruction address plus 4 and computes the branch offset incorrectly.

However, other microprocessors are able to handle branch instructions in branch delay slots. These microprocessors have two exception program counters, i.e., exception return address registers, to properly handle exceptions. Upon the detection of an exception, a CPU (Central Processing Unit) of a microprocessor interrupts the normal sequence of instruction execution and transfers to a prescribed routine to handle the particular exception. Care must be given to how the normal instruction sequence can be properly resumed after the exception has been handled. The exception program counters point to the instructions at which ordinary instruction execution may resume after the exception is handled. With two exception program counters, a microprocessor can easily handle the complications introduced by the occurrence of an exception during the execution of a branch instruction in a branch delay slot.

On the other hand, MIPS microprocessors have only one exception program counter. MIPS microprocessors handle exceptions, including interrupts, during the execution of instructions in branch delay slots. But MIPS microprocessors cannot handle the complex situation created by the occurrence of an exception during the execution of a branch instruction in a branch delay slot. Therefore, MIPS microprocessors simply prohibit branch instructions from branch delay slots.

In contrast, the present invention permits branch instructions in branch delay slots for MIPS microprocessors. This permits the computer code to be written more densely and the performance of the MIPS microprocessors/microcontrollers is enhanced. There is no need for NOP instructions in the delay slot. Furthermore, the present invention simplifies exception handling.

SUMMARY OF THE INVENTION

To accomplish these ends, the present invention provides for a method of operation in a microprocessor having a single exception program counter for indicating the location of an instruction to resume program execution after handling an exception, and a register for holding a bit indicative of whether the exception occurred in an branch delay slot.

According to the present invention, branch instructions may be placed in branch delay slots in a MIPS instruction architecture by setting the bits of the Exception Program Counter (EPC) and Branch Delay bit (BD bit), as described below. The EPC is a register which contains the address of the instruction where processing resumes after an exception has been serviced. The BD bit is a bit in the Cause Register whose contents describe the cause of the last exception. The BD bit indicates whether the last exception was taken while executing an instruction in a branch delay slot. BD=1 indicates that the last exception was taken in a branch delay slot; BD=0 indicates that the last exception occurred during the execution of a normal instruction, i.e., not in a delay slot. According to the present invention, the BD bit and the bits of the EPC are set as follows:

1) When the previous instruction is neither a taken branch nor a branch likely, the BD bit is 0 and the EPC points to the current instruction.

2) When the previous instruction is a taken branch or a branch likely, the BD bit is 1 and the EPC is the EPC for the previous instruction.

The present invention also provides for the optimizing instruction sequences to avoid NOP instructions in branch delay slot. Thus optimized computer programs can be coded with a branch instruction immediately following another branch instruction yielding higher CPU performance.

DETAILED DESCRIPTION OF PREFERRED EMBODIMENTS

Figure 1A:
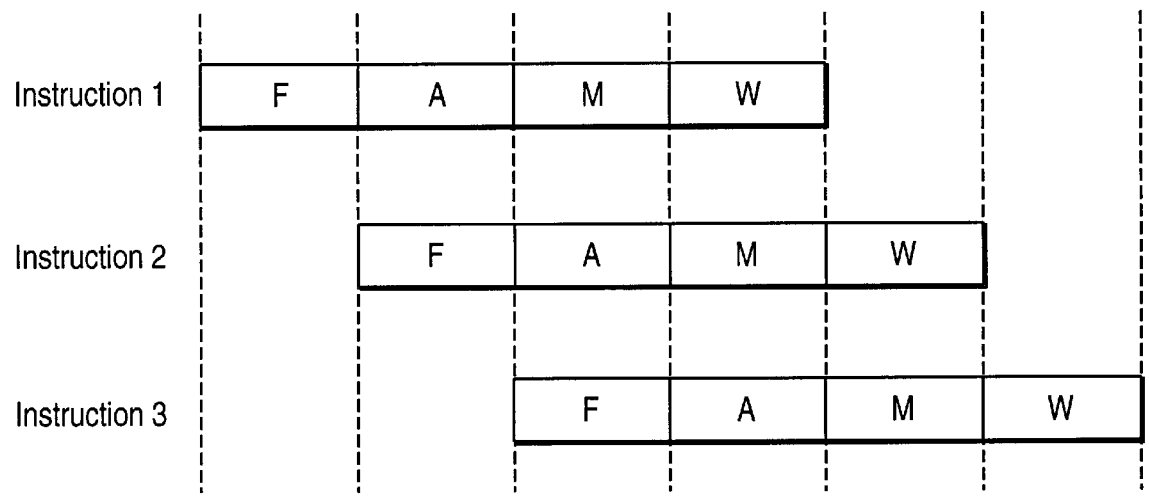
FIG. 1A illustrates a nominal sequence of instructions in a pipelined microprocessor.
Figure 1B:
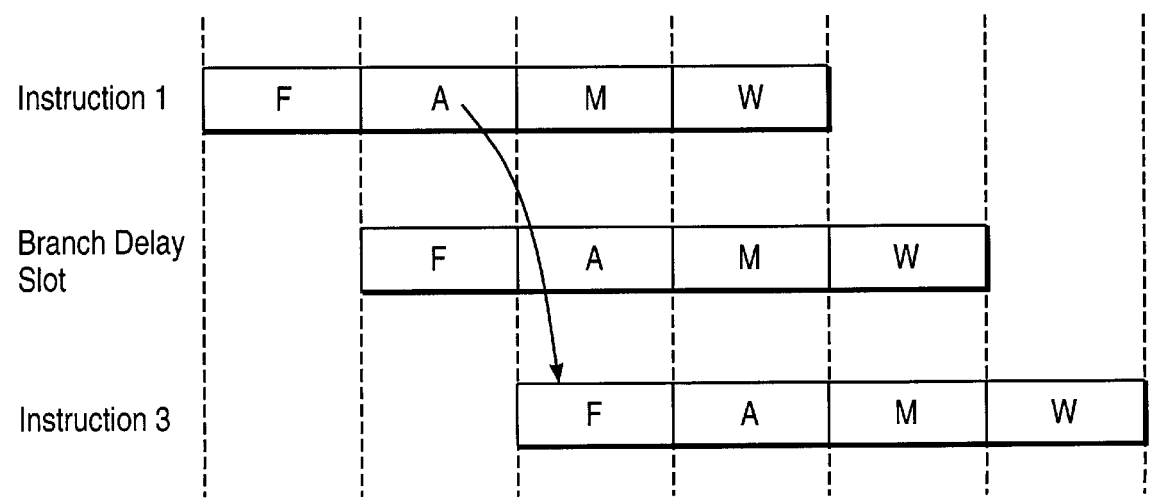
FIG. 1B illustrates how a branch delay slot is created by a branch instruction.

FIG. 1A illustrates a nominal sequence of computer instructions in a pipelined microprocessor. Each clock cycle is indicated by the spaces between the vertical lines. As shown, each instruction takes four clock cycles. The first cycle, represented by "F", is an instruction fetch; the second cycle, represented by "A", is an ALU operation; the third cycle, represented by "M", is a memory operation; and the fourth cycle, represented by "W", is a register file write operation. Thus the execution of one instruction is completed per clock cycle. When the computer instructions include a branch instruction, such as instruction 1 in FIG. 1B, a delay slot follows the branch instruction. When the branch instruction is fetched, the ALU takes one instruction cycle to calculate the address of the target instruction. The address calculation is completed too late for use to fetch instruction 2. The target address is ready for use to fetch instruction 3. Hence a branch instruction creates a branch delay slot in a sequence of pipelined instructions, as is illustrated by the dotted horizontal box.

The present invention is implemented with FIFOS (First-In, First-Out registers) of EPC values and BD bits. There is an EPC for each stage of the CPU pipeline. When BD=0, the next EPC FIFO entry is always the value in the PC. When BD=1, there are two alternatives for managing the EPC FIFO. The first alternative uses a constant length FIFO with duplicate entries. The second alternative uses a variable length FIFO with unique entries. In the constant length FIFO, the previous entry is duplicated when BD=1. The constant length method works best for a shift register style FIFO. The FIFO shifts with the pipeline. The clock to the first stage is inhibited to make a duplicate entry. With the alternative variable length FIFO, no new entry is made when BD=1. The variable length method works best for a RAM-based FIFO. Duplicating entries in the RAM would require an external register to save the previous entry.

A RAM-based FIFO is more complex but typically consumes less power and less area on an integrated circuit than a shift register FIFO. Each stage requires 32 RAM bits. Typical power consumption is due to writing one word at every instruction. Each stage of a shift register FIFO requires a 32-bit register composed of D flip-flops. Typical power consumption is due to clocking all stages every instruction.

Implementation of FIFOs, such as described above, are well-known to microprocessor designers.

Figure 2:
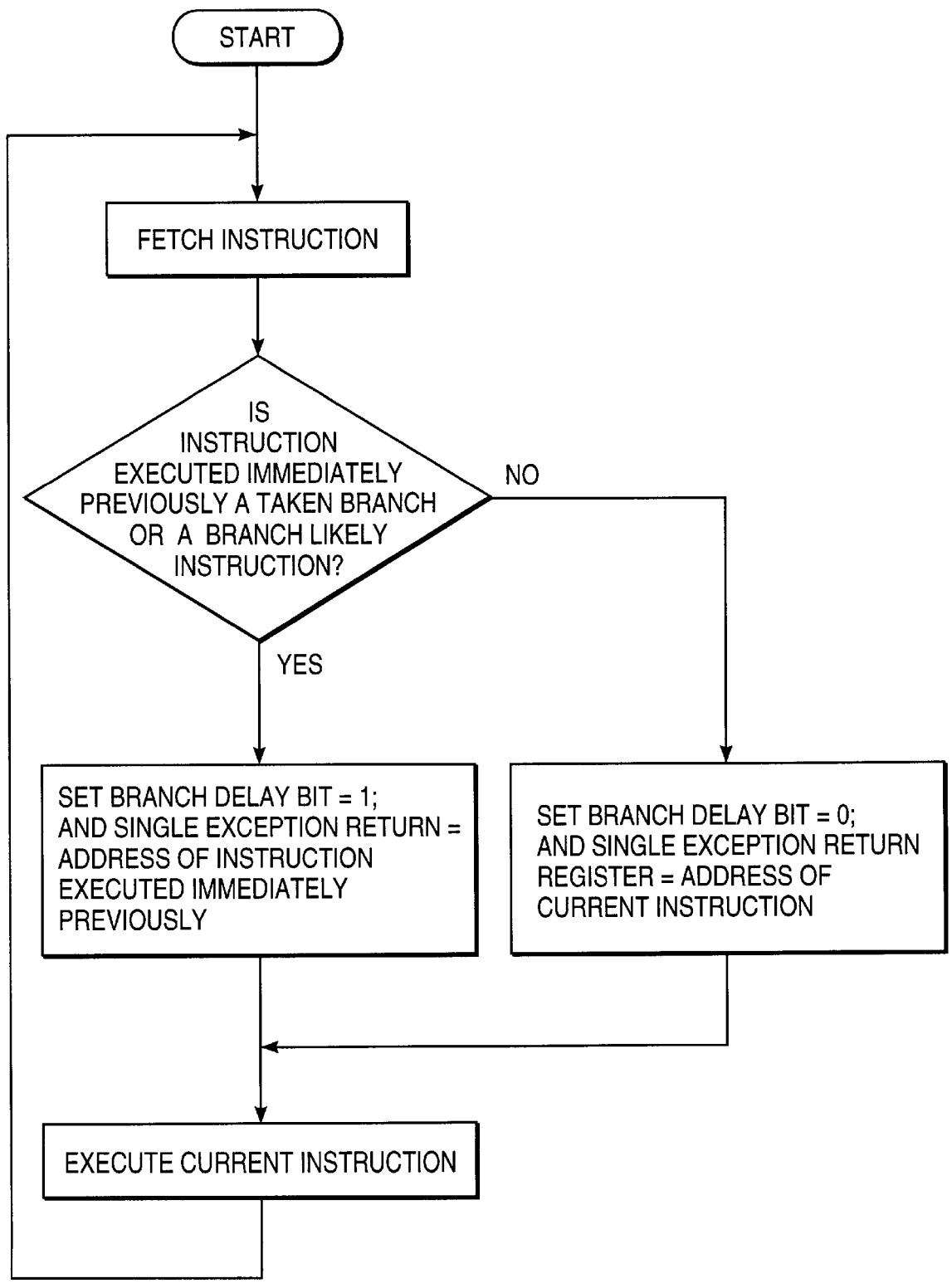
FIG. 2 is a flow chart of microprocessor operations, according to one embodiment of the present invention.

The described operation for the BD bit and the EPC register, as illustrated in FIG. 2, is an improvement on present day MIPS microprocessors in two ways. First, branches in branch delay slots are supported. When the rules above are applied to a branch chain, the BD bit is 1 and the EPC points to the first branch in the chain. This allows transparent returns from the servicing of exceptions.

Secondly, exception handling is simplified because the exception handler does not have to emulate conditional branches to return from nonretryable exceptions, such as SYSCALL, in a branch delay slot. (Note, it still may be best not to use some instructions, such as SYSCALL, in branch delay slots because of the performance impact of emulating instructions.) When the BD bit is 0, no branch is involved and no emulation is required. When the BD bit is 1, the rules above guarantee that all branches are taken except that the last branch may be a Branch Likely not taken. This special case (an exception after a Branch Likely not taken) does not cause any complications. The instruction following a Branch Likely not taken is annulled so only instruction fetch Address Error or TLB Miss exceptions can occur. Alternatively, a MIPS microprocessor may suppress all exceptions on annulled instructions so no exceptions can occur. Return from exception is not required after an instruction fetch Address Error. Return from exception is easy to handle after an instruction fetch TLB Miss by simply fixing the TLB (Translation Lookaside Buffer) and executing a Jump Register to the EPC value.

With the present invention, programming for MIPS microprocessors can be optimized. The basic optimization is to move a useful instruction from the branch target into the branch delay slot and branch to the target address+4. In passing, it should be noted that the MIPS microprocessors increment the instruction addresses by 4. Thus the instruction at the target address+4 is the instruction following the target address. The minor case where this optimization cannot be used occurs when the branch already has maximum displacement, i.e., the displacement+4 address is too big for its immediate field.

Five branch optimization examples are shown below.

The following generic op-codes are used in the examples:

| | B | Unconditional branch or jump |
|---|---|---|
| | BC | Conditional branch |
| | BL | Branch Likely |
| | XX | Instruction at target address X |
| 1) Basic: | | | |
| | B | X | B | X+4 |
| | NOP | | XX | |

This example illustrates how a NOP instruction in the delay slot for the instruction sequence on the left is replaced by the target instruction itself in the optimized sequence on the right. The new target instruction for the branch instruction is the instruction following the previous target instruction at address X.

```
2) BC -> BL:
           BC     X       BL     X+4
           NOP            XX
```

In this example, a Conditional Branch instruction followed by a NOP instruction sequence in the left instruction sequence is optimized by substituting a Branch Likely instruction, as shown by the sequence on the right. The target instruction is placed into the delay slot to avoid a NOP instruction and the new target instruction is the instruction following the previous target instruction at address X.

3) BC with identical instructions in taken and not taken paths:

```
           BC     X       BC     X+4
           NOP            XX
           XX
           .
           .
           .
X:         XX
```

This optimization works when the not taken instruction is identical in every way to the taken instruction. Note that if XX itself is a Conditional Branch instruction, the result is a tight 4-way branch.

```
4)    Branch folding:
      B/BL    X           B/BL    Y
      B       Y           XX
```

The reverse transform between the two sequences is useful to do a far Branch Likely.

```
5)    Exclusive branch conditions: On any single pass
      through the code, either of the branches may be
      taken, but both branches cannot be taken.
      BC       X           BC      X
      NOP                  BC/BL   Y
      BC/BL    Y
```

Again the optimized sequence on the right avoids a NOP instruction. A Conditional Branch or a Branch Likely instruction is placed in the delay slot of the first Conditional Branch instruction where a NOP instruction is required on the sequence on the left.

While the above is a complete description of the preferred embodiments of the present invention, various alternatives, modifications and equivalents may be used. It should be evident that the present invention is equally applicable by making appropriate modifications to the embodiment described above. For example, the present invention should be applicable to microprocessors and microcontrollers which operate similarly and having similar instruction set architectures to MIPS microprocessors. Therefore, the above description should not be taken as limiting the scope of invention which is defined by the metes and bounds of the appended claims.

What is claimed is:

1. In a microprocessor having only one exception return address register for indicating the location of an instruction to resume execution after handling an exception, and a register for holding a bit indicative of whether said exception occurred in a branch delay slot, a method of operation comprising setting said bit to a first logic state and said exception return address register to a location of a current instruction when the instruction executed immediately previously is neither a taken branch nor a branch likely instruction; and setting said bit to a second logic state and said exception return address register to the exception return address for said instruction executed immediately previously if said instruction executed immediately previously is a taken branch or a branch likely;

whereby branch instructions may be placed in branch delay slots and exceptions may be handled in said branch delay slots with said only one exception return address register.

2. The method of CPU operation of claim 1 wherein said first logic state comprises a logic 0 and said second logic state comprises a logic 1.

3. In a CPU having only one exception return address register for indicating the location of an instruction to resume execution after handling an exception, and a register for holding a bit indicative of whether said exception occurred in a branch delay slot, said CPU having a plurality of pipeline stages, a method of operation comprising setting said bit to a first logic state and said exception return address register to a location of a current instruction if the instruction executed immediately previously is neither a taken branch nor a branch likely instruction;

setting said bit to a second logic state and said exception return address register to the exception return address of said instruction executed immediately previously if said instruction executed immediately previously is a taken branch or a branch likely;

whereby branch instructions may be placed in branch delay and exceptions may be handled in said branch delay slots with said only one exception return address register.

* * * * *